United States Patent [19]

Schmidt et al.

[11] Patent Number: 4,985,707

[45] Date of Patent: Jan. 15, 1991

[54] RETRODIRECTIVE ADAPTIVE LOOP FOR METEOR COMMUNICATIONS

[75] Inventors: Charles J. Schmidt, River Vale; Joseph Kadin, Florham Park, both of N.J.; S. Eugene Poteat, McLean, Va.

[73] Assignee: BroadCom, Inc., Mahwah, N.J.

[21] Appl. No.: 294,716

[22] Filed: Jan. 9, 1989

[51] Int. Cl.[5] .......................... H01Q 1/00; H04B 7/00

[52] U.S. Cl. .................................... 342/370; 342/367; 455/56

[58] Field of Search .................... 342/367, 370; 455/56

[56] References Cited

U.S. PATENT DOCUMENTS

| | | | |
|---|---|---|---|
| 2,239,775 | 4/1941 | Bruce | 342/367 |
| 3,020,399 | 2/1962 | Hollis . | |
| 3,054,895 | 9/1962 | Forsyth . | |
| 3,133,250 | 5/1964 | Molmud . | |
| 3,300,782 | 1/1967 | Margerum et al. | 342/370 |
| 3,351,859 | 11/1967 | Groth, Jr. et al. . | |
| 3,611,381 | 10/1971 | Preikschat et al. | 342/370 |
| 3,757,335 | 9/1973 | Gruenberg . | |
| 3,916,406 | 10/1975 | Miller et al. . | |
| 4,001,691 | 1/1977 | Gruenberg . | |
| 4,107,609 | 8/1978 | Gruenberg . | |
| 4,277,845 | 7/1981 | Smith et al. . | |
| 4,337,376 | 6/1982 | Gruenberg . | |
| 4,451,699 | 5/1984 | Gruenberg . | |
| 4,685,149 | 8/1987 | Smith et al. . | |

OTHER PUBLICATIONS

Von R. Eshelman and Laurence A. Manning, "Radio Communication by Scattering from Meteoric Ionization," Proc. IRE, Mar. 1954, pp. 530–536.

P. A. Forsyth, E. L. Vogan, D. R. Hansen and C. O. Hines, "The Principles of JANET—A Meteor-Burst Communication System," Proc. IRE, Dec. 1957, pp. 1642–1657.

J. L. Heritage, J. E. Bickel and C. P. Kugel, "Meteor Burst Communication in Minimum Essential Emergency Communication Network", (MEECN)-Naval Ocean Systems Center Technical Report (38, Aug. 16, 1979).

*Primary Examiner*—Gregory C. Issing
*Attorney, Agent, or Firm*—David B. Newman Jr. & Associates

[57] ABSTRACT

Communications link using the ionized trail of a meteor entering the atmosphere at an altitude of approximately 100 kilometers as reflectors to relay radio frequency energy beyond the horizon using a retrodirective adaptive loop. The retrodirective adaptive loop includes a plurality of conjugate antenna elements, with each conjugate antenna element having a spatial servo-loop circuit. At least two stations having antennas with conjugate elements are required for generating a retrodirective oscillating or phase locked loop.

22 Claims, 5 Drawing Sheets

RETRODIRECTIVE ADAPTIVE LOOP FOR METEOR COMMUNICATIONS

BACKGROUND OF THE INVENTION

This invention relates to a retrodirective adaptive loop for a communications and control channel, and more particularly to a communications system capable of using a scattering medium comprising meteors.

DESCRIPTION OF THE PRIOR ART

Ionized trails for meteors entering the atmosphere are used as reflectors and scatterers to enable communicators between stations to establish a beyond the horizon communications link. Typically, transmitter and receiver stations spaced from 200–2000 km are able to communicate by meteor burst communications over these ranges. Meteor burst communications, however, often are vulnerable to intercept by non-intended receiving parties. Frequencies between 30 MHz to 100 MHz are employed for such communications.

Of the many meteors entering the earth's atmosphere daily, having an ionized trail, relatively few leave an ionized electron trail of sufficient density and orientation to permit point to point communications. Additionally, meteor burst communications is very sporadic with existing transmitter and receiver stations providing only on the order of fifty channel openings per hour of one second duration with a typical bandwidth of a few kilohertz. This performance also is modulated by diurnal and seasonal effects and variations.

Meteor burst communication systems are limited in their applicability as a communications link due to the low availability of meteors of proper orientation for scattering communications signals, and in the effective data rate by which information can be transmitted over the meteor burst communications channel. A user of meteor burst communications systems continuously probes for a properly oriented meteor in order to establish a communications link.

When a meteor burst communications systems link is established, data are transmitted via the link. Typically, a user of the meteor burst channel uses a broad beamwidth antenna to probe for the presence of meteors from which to scatter the communications signal, and when he transmits data, the data are broadcast using the same broad beamwidth antenna.

Increasing transmitter power permits lower intensity ionized meteor trails to be used and enables the lower intensity ionized meteor trails to be worked for a longer period in their exponential decay time. A problem exists in using high gain antennas, however, which can improve the performance in a manner similar to increasing transmitter power, since the narrower antenna beamwidth associated with the higher gain antennas reduces the spatial volume in which suitable ionized meteor trails can be found. The result of using such high gain antennas is that lower intensity trails can be worked for longer durations, but fewer meteor trails will be found for use for the meteor burst communications channel. Accordingly, little improvement in channel information capacity is realized by changing from a low gain to a high gain antenna.

It has not been possible heretofore to establish an effective high data rate communications channel between remotely located terminals using meteor burst communications due to the lack of a large number of densely and properly oriented ionized meteor trails from which to scatter signal energy over a long distance for long periods of time. The difficulty of pointing a high gain, narrow beamwidth antenna and effectively using low density ionized meteor trails has obviated the use of this solution.

Further, it has not been possible to establish a meteor burst communications channel using a highly directional antenna system which remains in a passive mode until a properly oriented meteor comes into view.

SUMMARY AND OBJECTS OF THE INVENTION

It is an object of the present invention to provide a free space oscillating or adaptive loop for a communications and control channel between remotely located terminals via a scattering medium using ionized meteor trails.

It is another object of the present invention to be able to establish a meteor burst communications channel over which communications information can be sent for a longer period of time.

It is a further object of the present invention to establish a meteor burst communications system wherein low intensity ionized meteor trails can be utilized for establishing a useful communications and control channel.

According to the present invention, as embodied and broadly described herein, a communications system is provided comprising a first station having first antenna means, a second station having second antenna means, a scattering medium, and means coupled to the first antenna means for transmitting a pilot signal from the first antenna means. Also provided is a scattering medium having a stream of reflectors, which may be, for example, the ionized trails of meteors entering the earth's atmosphere. The first antenna means may be embodied as a first phased-array antenna which is capable of forming a first broad beamwidth and a first narrow beamwidth. The first phased-array antenna includes first conjugate elements. The second antenna means may be embodied as a second phased-array antenna capable of forming a second broad beamwidth and a second narrow beamwidth. The second phased-array antenna includes second conjugate elements. The first phased-array antenna and the second phased-array antenna are in common view of the scattering medium having the stream of reflectors. Also included is means located at the first station and coupled to the first phased-array antenna, for transmitting a pilot signal or narrow band noise source signal from the first phased-array antenna when the first phased-array antenna is using the first broad beamwidth. The pilot signal or narrow band noise source signal transmitted from the first phased-array antenna is reflected from ionized meteor trails when the ionized meteor trails are present in a scattering medium. In response to receiving the pilot signal or narrow band noise source signal transmitted from the first phased-array antenna and reflected from the scattering medium, the second phased-array antenna amplifies and retransmits a spatially coherent pilot signal or narrow band noise signal signal to the first phased-array antenna. This retransmission is labeled the second retrodirective wave front.

When the first phased-array antenna, using the first conjugate elements receives the focused pilot signal retransmitted from the second phased-array antenna and reflected from the scattering medium, the first phased-array antenna again retransmits the pilot signal to the second phased-array antenna. This retransmission from the first phased-array antenna to the second phased-array antenna is labeled the first retrodirective wave front.

In response to receiving the retransmitted pilot signal from the second phased-array antenna, the first phased-array antenna forms the first narrow beamwidth, and focuses the narrow beamwidth at the scattering medium from which the retransmitted pilot signal from the second phased-array antenna is being reflected from the ionized meteor trails. In response to receiving the retransmitted pilot signal from the first phased-array antenna, the second phased-array antenna may form the second narrow beamwidth and focuses the antenna beamwidth at the scattering medium. The antenna focusing and coherent pilot signal buildup establishes a free space oscillating loop, with the first phased-array antenna using the first narrow beamwidth and the second phased-array antenna using the second narrow beamwidth and with both of these narrow beamwidths focused in common view of the scattering medium at the ionized meteor trails entering the earth's atmosphere. Accordingly, a communications link is established with the presence of this control link of the retrodirective wave fronts.

Additional objects and advantages of the inventions will be set forth in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

DETAILED DESCRIPTION OF THE PREFERRED EMBODIMENTS

U.S. Pat. No. 3,757,335 entitled Communication Control System to Gruenberg, U.S. Pat. No. 4,337,376 entitled Communcation System and Network to Gruenberg, U.S. Pat. No. 4,001,691 to Gruenbert, U.S. Pat. No. 4,107,609 to Gruenberg, U.S. Pat. No. 2,908,002 to Van Atta and U.S. Pat. No. 3,757,335 to Gruenberg, are relevant to the present invention and are all expressly incorporated herein by reference.

Reference will now be made in detail to the present preferred embodiments of the invention, examples of which are illustrated in the accompanying drawings.

Figure 1:
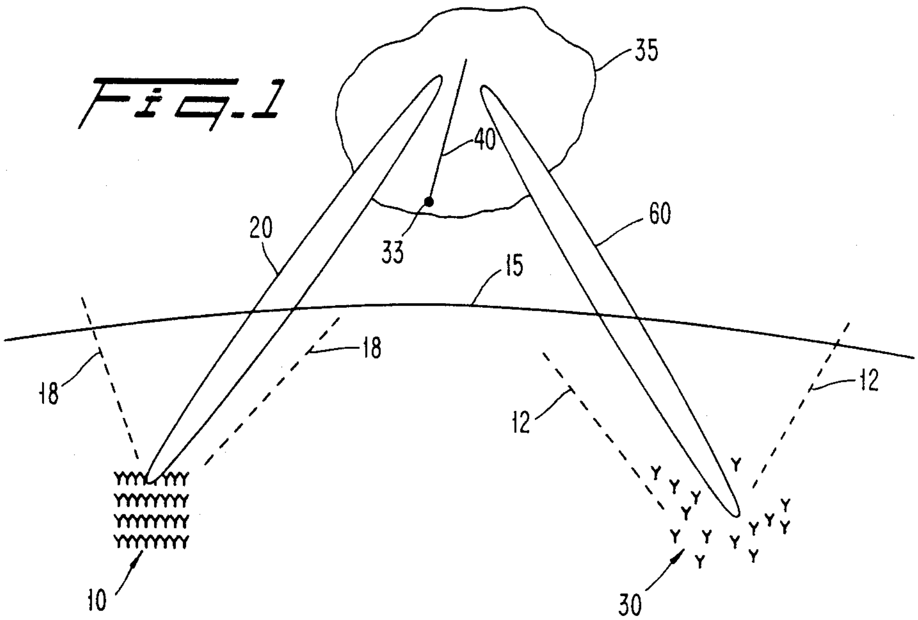
FIG. 1 illustrates a first station and a second station with each having a phased-array, communicating over the earth's horizon with high gain narrow beamwidths via scattering from the ionized trail of meteors entering the earth's atmosphere.

Referring to FIG. 1, a meteor burst communications system according to the present invention is shown comprising a first station having first antenna means, a second station having second antenna means, and a scattering medium 35. The first antenna means may be embodied as a first phased-array antenna 10 which is capable of forming a first broad beamwidth 18 and a first narrow beamwidth 20. The second antenna means may be embodied as a second phased-array antenna 30 capable of forming a second broad beamwidth 12 and a second narrow beamwidth 60. The first phased-array antenna 10 and the second phased-array antenna 30 are in common view of the scattering medium 35. The scattering medium may include a stream of reflectors which may be, for example the ionized trails 40 of meteors 33 entering the earth's atmosphere. The first phased-array antenna 10 and second phased-array antenna 30 are remotely located from each other, typically beyond the horizon 15.

The first station may include means coupled to the first phased-array antenna 10 for transmitting a pilot signal from the first phased-array antenna 10. The initial pilot signal may be noncoherent tones, or may be noise intentionally induced into the first phased-array antenna 10. The pilot signal is transmitted from the first phased-array antenna 10 when the first phased-array antenna 10 is used with the first broad beamwidth 19. The pilot signal transmitted from the first phased-array antenna 10 is reflected from the ionized trails 40 of meteors 33 which may be present in the scattering medium 35. A receiver located at and coupled to the second phased-array antenna 30 is listening for the pilot signal using the second broad beamwidth 12. In response to receiving the pilot signal transmitted from the first phased-array antenna 10 and reflected from the scattering medium 35, the second phased-array antenna 30 retransmits the pilot signal to the first phased-array antenna 10 via the second narrow beamwidth 60. This retransmission is labeled the second retrodirective wave front.

Figure 2:
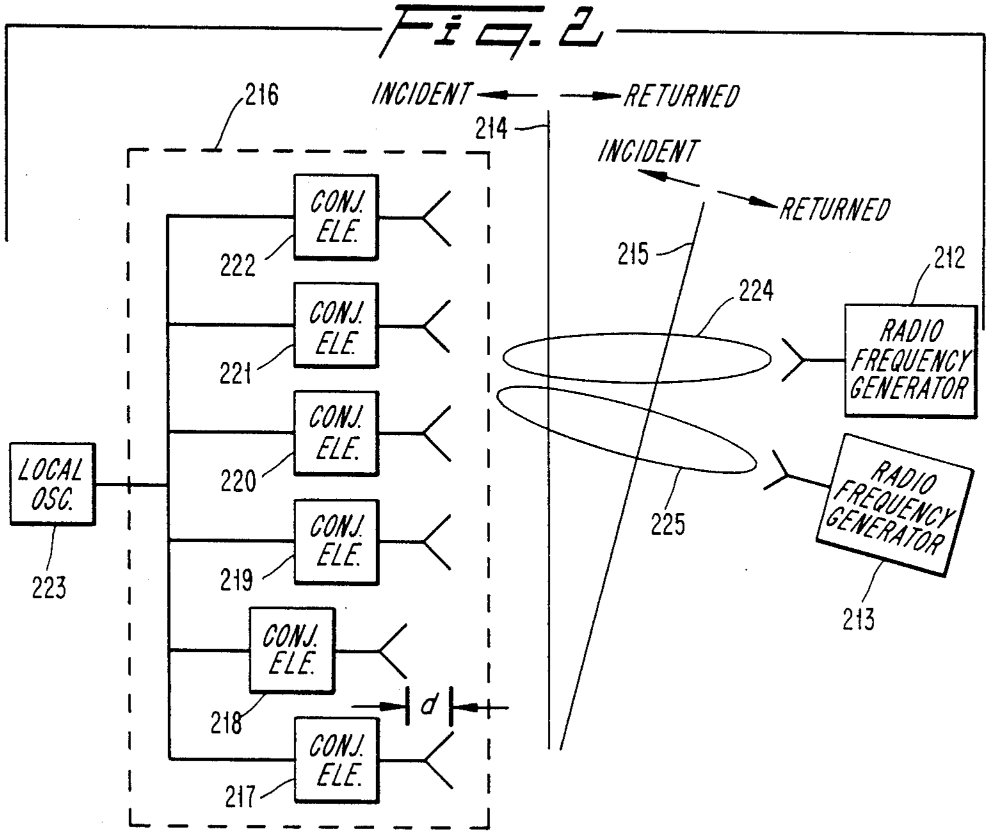
FIG. 2 is a diagram of a conjugate retrodirective phased-array forming a return beam in the direction of two radio frequency sources located at different azimuth angles.

As illustratively shown in FIG. 2, the first phased-array antenna 10 includes a plurality of conjugate elements 216. Similarly, the second phased-array antenna 30 includes a second plurality of conjugate elements. In response to receiving the pilot signal transmitted from the first phased-array antenna 10 and reflected from the scattering medium 35, the second phased-array antenna 30 retransmits pilot signal to the first phased-array antenna 10 while the second phased-array antenna 30 is using the second narrow beamwidth 60. This retransmission is effected using second conjugate elements.

Similarly, when the first phased-array antenna 10, using the first plurality of conjugate elements 216 receives the pilot signal retransmitted from the second phased-array antenna 30, and reflected from the scattering medium 35, the first phased-array antenna 10 retransmits the pilot signal to the second phased-array antenna 30. This retransmission from the first phased-array antenna 10 to the second phased-array antenna 30 is labeled the first retrodirective wave front.

Referring to FIG. 1, the first and second stations may not be within direct line of sight of each other because they are remotely located at distances greater than the horizon 15. Any meteor trail 40 formed by meteor 33 of adequate electron density and proper orientation falling within the scattering boundary of the scattering medium, which is within the boundary of the broad antenna beamwidth of the first phased-array antenna 10 and second phased-array antenna 30 will be a candidate for initiating the meteor burst communications link. As the oscillating loop builds up to a continuous wave pilot signal, the narrow beamwidths 20, 60 of first phased array 10 and second phased array 30 will be formed by the coherent reception across the array of the pilot signal which forms the retrodirective beam and determines the direction of a plane wave. The effect is similar to a zoom lens with narrow beamwidth 20, 60 converging on the meteor trail.

FIG. 2 illustrates the retrodirective capability of the plurality of conjugate elements 216. As illustratively shown, two radio frequency generators 212, 213 are located at different directions and at sufficient distances to cause plain wave fronts 214, 215 to arrive at the plurality of conjugate elements 216. The plurality of conjugate elements 216 includes a common local oscillator 223, and conjugate elements 217, 218, 219, 220, 221, 222. FIG. 2 illustratively shown a linear phased-array antenna including six conjugate elements, however any number of conjugate elements arranged in a line or in two or three dimensions on a plane or conformal surface may be employed. The detail of a particular conjugate element is shown in FIG. 3.

When a perpendicularly incident wave front 214 from radio frequency generator 212 reaches the face of the plurality of conjugate elements 216, all of the elements, except element 218, receive a signal of identical phase. Since each conjugate element is aligned to provide an identical phased delay, the returned wave front 214 is coherent and forms a narrow beamwidth 224 radiating in the direction of the radio frequency source. Displacement of conjugate element 218 from the plane of the phased-array antenna by distance d does not disturb the retrodirective wave front and this demonstrates one of the advantages of a conjugate element which is described hereinafter. If radio frequency source 212 is turned off, and radio frequency source 213 is made to radiate, the incident wave front to 215 will reach conjugate elements 217, 218, 219, 220, 221, 222 in the face of the plurality of conjugate elements 216 with a progressively lagging phase taper. Conjugate elements 217–222 accordingly will convert this taper to provide a coherent leading taper to steer the return wave front 215 towards the radio frequency generator 213. This forms a narrow beamwidth 225 pointing in the direction of radio generator 213. Further operations of the retrodirective antennas are disclosed in U.S. Pat. No. 2,908,002 issued to Van Atta, which is expressly incorporated herein by reference.

Figure 3:
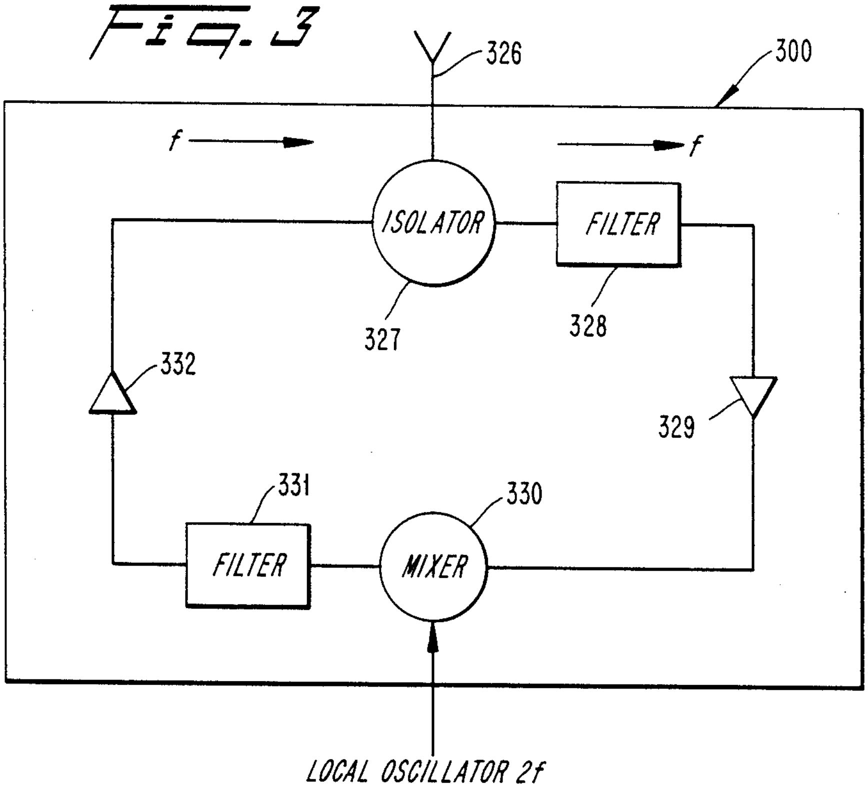
FIG. 3 is a block diagram of a conjugate element.

A particular conjugate element which is used in the plurality of conjugate elements 216 of the present invention, is shown in FIG. 3. The conjugate element 300 includes a radiating element 326 which may be of any familiar type such as a dipole, monopole, yagi, subarray of dipoles, loop, etc. The radiating element 316 has a broad antenna pattern for permitting a wide angle coverage to the phased-array antenna. Also shown is an isolator 327 which is used to separate the received signal from the transmitted signal. The cascade gain of the amplifiers 329, 332 must be less than the total isolation of the isolator 327, the loss in the filter 328, and the loss in the mixer 330, to prevent local oscillation. The isolator will provide limited isolation of 20–30 dB and other means must be employed such as providing a frequency offset between the received and transmitted frequency so that both radio frequency and intermediate frequency filters can be used to obtain the high gain required without local oscillation for a long range communication. As shown, the conjugate element 300 includes an isolator 327 coupled to a filter 328, which is coupled to an amplifier 329, coupled to a mixer 330, coupled to filter 331, coupled to amplifier 332, which is in turn coupled to the isolator 327. The isolator is further coupled to the radiating element 326.

Referring to FIG. 3, the signal at the first frequency f is received, passes through the circulator 327, the first filter 328, and the first amplifier 329 into the mixer 330. The signal at the first frequency f, is mixed with the local oscillator signal at frequency 2f which is common to all elements in a given phased-array antenna. The difference between the product of the local oscillator signal 2f and the incoming received signal at frequency f is filtered using second filter 331 and amplified using second amplifier 332. The mixer 330 effectively inverts the spectrum of the signal and thus provides the conjugating action which is explained with the aid of the vectors as shown in FIG. 4.

Figure 4A:
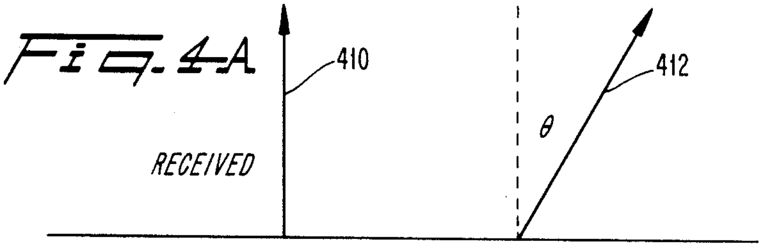
FIG. 4A illustrates phase conjugation receiving vector diagrams.
Figure 4B:
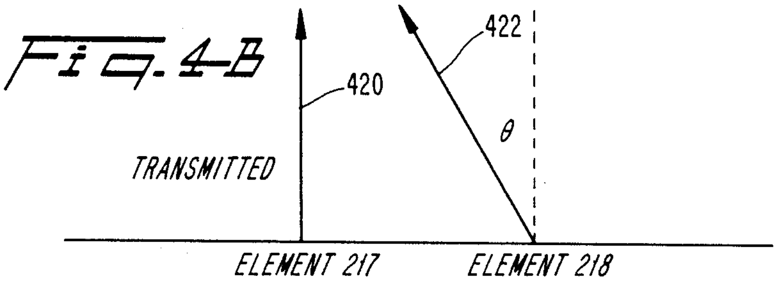
FIG. 4B illustrates phase conjugation for transmitting vector diagrams.

As shown in FIGS. 4A and 4B, a referenced received vector 410, a corresponding transmitted vector 420, a received vector 412, and a corresponding transmitted signal vector 422 are shown. The received vector 412 illustrates a signal received from the wave front 214, received at conjugate element 218 which in FIG. 2, is displaced by distance d from the other conjugate elements of the phased-array antenna. The referenced received signal vector 410 is received at all of the conjugate elements, 217, 219, 220, 221, 222. The received signal vector 412 at element 218 lags the received reference vector 410 by the amount $\theta = 360\ d/\lambda$, where $\theta$ is the electrical delay phase angle and $\lambda$ is the radio frequency wave length. The difference product of the mixer 330, because of the spectrum inversion, advances the phase of the signal at an equal amount $\theta$. This phase lead compensates for the received phase lag inserted by distance d. It permits the conjugate element 218 transmitted signal phase to advance and to match the phase with signals from other elements to form the returned wave front 214 and the narrow beamwidth 224 as shown in FIG. 2.

In a similar manor, the coherent returned wave front 215 and narrow antenna beamwidth 225 as shown in FIG. 2, are formed in another direction where the incident wave front comes from a second direction. The returned wave front is not disturbed by displacement of the conjugate element 218 nor by its rate of displacement $d\theta/dt$. This means that the doppler frequency caused by the motion of the element or the array is cancelled in the example using the same received and transmitted frequency. If a frequency offset is used for reasons of isolation as mentioned previously, the motion and displacement effects are a function of the received and transmitted frequency difference.

Conjugate elements in phased array antennas require identical phase alignment and a common local oscillator fed in phase to each element. The conjugate elements can be mounted on an irregular surface to form a conformal phased-array antenna. They can be used on a surface with differential motions such as a flexing wing. Also, they may be distributed at random or in a thinned antenna configuration provided that side lobe and grating lobe effects are taken into consideration. An array of conjugate elements providing a retrodirective wave front, can be provided with an amplitude taper to control side lobe levels as in any phased array antenna. The phased-array antenna 10 may comprise uniformly spaced conjugate elements, or some type of random spacing as illustrated by antenna 30.

Figure 5:
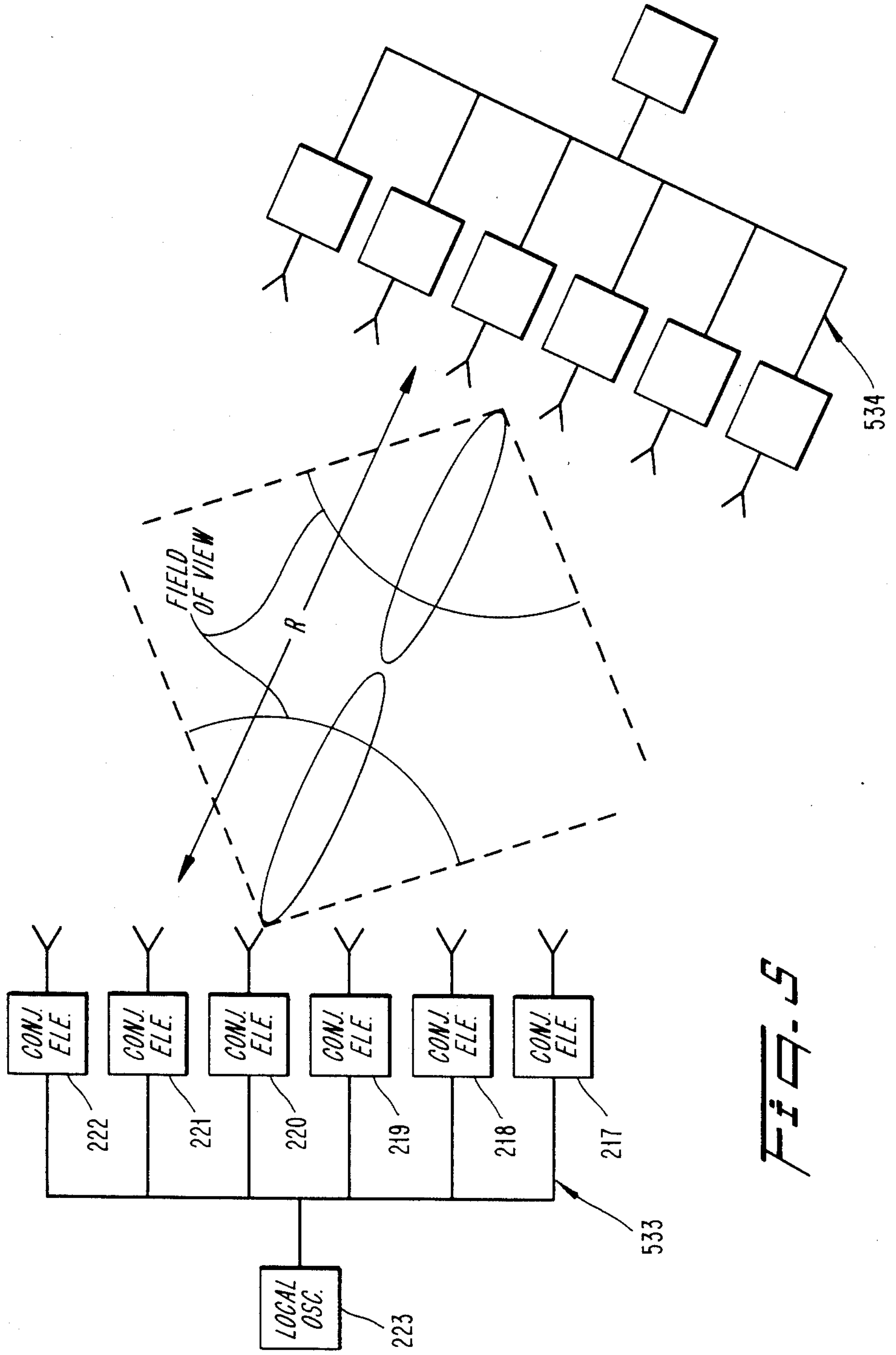
FIG. 5 depicts a free space oscillating loop between two phased-array antennas.

The retrodirective oscillating loop is shown diagrammatically in FIG. 5. The free space oscillating loop is also described in U.S. Pat. No. 3,757,335 which is expressly incorporated herein by reference. FIG. 5 depicts two phased-array antennas 533, 534 which are similar to the phased-array antenna 216 of FIG. 2, with the phased array antenna 533 having conjugate elements 217–222 which were described with reference to FIG. 3. The two phased-array antennas 533, 534 are separated by a range R and are within the typically 120° wide field of view which is determined by the individual phased-array element antenna patterns. By using Nyquist's criterion for oscillation, and setting the gain A around the loop from first phased-array antenna 533 to and through second phased-array antenna 534, back to first phased-array 533 and through second phased-array antenna 534 to a value greater in unity, the loop will break into oscillation at a radio frequency determined by the first and second filters 328, 331 in FIG. 3 at the frequency f. This effect is analogous to the audio squeal set up in an auditorium by a public address system when the gain is set to high and there is adequate feedback between the loud speakers and the microphones. Each conjugate element in the first phased-array antenna 533 will radiate random thermal noise generated in the front end of the first receiver amplifier 329, of FIG. 3. The noise power, $P = KTB$, where K is Boltzmann's constant, T is the absolute temperature, and B is the band width of the first and second filter 331. The noise power is amplified by the gain of the first and second amplifiers 329, 332 and is reduced by the losses in the mixer 333 and the circular and filter losses. The overall electronic gain, to and from the circulator 327 is designated A. The total power radiated from all elements in an array will cover the broad element beamwidth of each individual elements. Since the element noise signals are not coherent across the arrays, no narrower beamwidth will be formed. When the noise signal reaches the second phased-array antenna 534, the plane wave front is coherent across the second phased-array antenna 534 because it appears to come from a distant point source. When power is applied to the second phased-array antenna, the noise signal from the first phased-array antenna is amplified coherently in the conjugate elements of the second phased-array antenna 534 and returned to the first phased-array antenna 533 in a retrodirective beam. In passing through he second phased-array antenna 534, the noise signal increases by $G^2A$ where G is the gain of the array and A is the electronic gain of a conjugate element. If $G^2A - L \geqq 1$, at each array, the gain around the loop will be greater than unity and the oscillation will build up to form a narrow band pilot signal at a frequency determined by first and second filters 328, 331. $L = \lambda^2/(4\pi R)^2$ is the one way space loss so each phased-array antenna must contribute $G^2A$ to the overall loop gain. There is no requirement that the phased-array antennas be identical or that the gain be equally divided. The requirement that the gains and losses for a complete circuit around a loop exceed unity must be satisfied for oscillation to build up. The oscillation will build up until second amplifier 332 is saturated in a manner similar to any conventional oscillator in which the signal built up from the noise level to the saturation or limit level when the loop is first closed. In practical systems, the gain A in the element of FIG. 3 can be high, 100 dB or over, and the simple circulator will not provide adequate isolation. A frequency offset can be used by separating the received and transmitted frequencies. Radio frequency and intermediate frequency filters can then be used to increase the isolation without restricting the conditions for oscillation. The doppler cancellation and the compensations for element displacement of the conjugate element described previously will be compensated precisely if the received and transmitted frequencies are identical. The compensation, however, will deviate from the ideal in proportion to wavelength changes as the received frequency and the transmitted frequency are separated. The coherent pilot signals formed by the oscillation between the first and second phased-array antennas contain the phased taper information used to form and steer the retrodirective beam. If one of the stations is moved, the beam will track it. These pilot signals can be modulated to provide full duplex communications between stations, or alternatively, the phased taper can be recovered from the pilot signal and used to phase an offset carrier containing the modulation information for retrodirective steering to the remote arrays.

Figure 6:
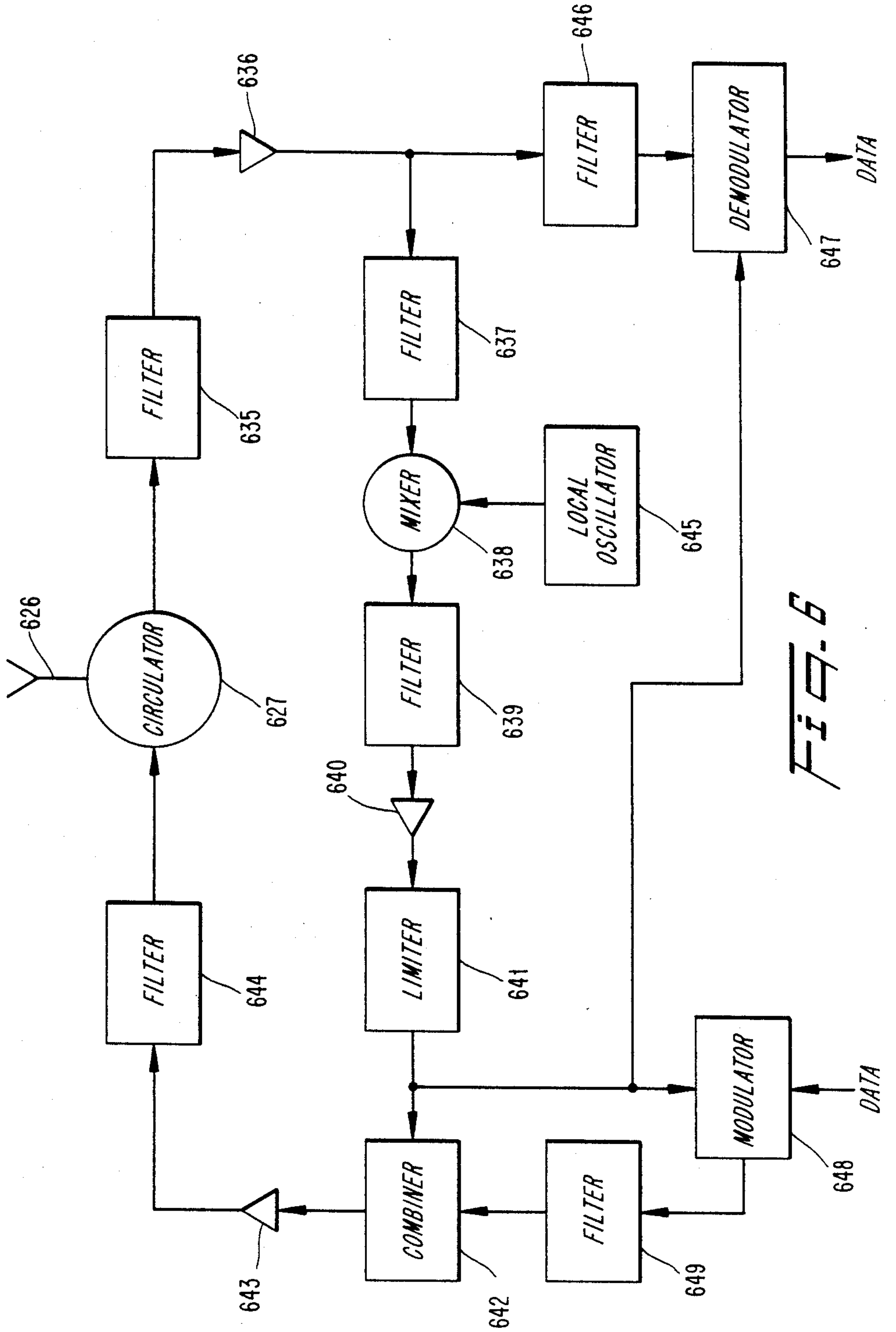
FIG. 6 is a block diagram of a typical element which may be used in a meteor burst link phased-array.

FIG. 6 is a diagram of one embodiment of many possible designs of a conjugate element suitable for use in the self-steering retrodirective meteor link communication arrays, 10 and 30, illustrated in FIG. 1. The frequencies chosen are for illustration purposes and may not be optimum. The element 626 and circulator 627 have been previously described although the circulator may not be practical nor necessary in the VHF band. Isolation is obtained by the diplexing action of filters 635, 644. The received pilot and modulation is received at 31 MHz and filtered in filter 635, amplified in amplifier 636, and fed in parallel to narrow band pilot address filter 637 and to modulation filter 646. The output of filter 637 is fed to the conjugating mixer 638 which is fed by common local oscillator 645 at 64 MHz. The difference product at 33 MHz is filtered by 639 and amplified by 640. This continuous wave pilot signal is limited at a predetermined amplitude by limiter 641. It is then fed to combiner 642, power amplifier 643, final filter 645, and transmitted through circulator 627 and element 626. The path 635 through 644 determines the electronic gain A of the element as well as the frequency of loop oscillation by means of the narrow band pilot address filter 637 which will have a band width typically on the order of less than 1 kHz. The coherent pilot is tapped off after the limiter 641 and modulated by the data signal in modulator 648 which adds the phase taper to the modulation signal. The modulated signal filtered in 649 and combined with the pilot signal in combiner 642. If suppressed carrier modulation is used in modulator 648, the modulating signal can be combined in combiner 642 directly. If other modulation methods are used which will result in sidebands that would interfere with the pilot, a carrier offset frequency can be used to translate the modulation away from the pilot frequency. This offset coherent modulation carrier and modulation signal is fed to each element in phase, similar to the local oscillator, and it is then mixed with the pilot after the limiter 641 and modulator 648 to impart the retrodirective phase taper on this modulation signal and carrier. The received data signal from the remote station is filtered in filter 646 and demodulated in demodulator 647 by mixing with the pilot reference signal. This strips off the phase taper and permits the coherent addition of data signals from all elements. It thus forms a narrow receive beam for the data signals.

The received pilot frequency at the remote station is at 33 MHz and when mixed with a 64 MHz local oscillator, transmits a 31 MHz pilot frequency back to the first station. A separate narrow band pilot address frequency can be assigned to each station and when communication to that station is required, the matching filter can be switched into the loop by the calling station to initiate the pilot oscillation. Selective addressing of many stations can thus be achieved.

A common array can be used to form multiple beams at different frequencies to work multiple meteor trails simultaneously by paralleling the circuits behind the element 626 in FIG. 6 and employing different pilot and modulation filters to separate the different signals. This will also contribute to increased data rate between terminals. It can enable a station to communicate simultaneously with more than one station or to act as a relay. The antenna arrays need not be identical. For example, one can be larger than the other. In the limiting case one terminal can have a single element.

There are many other implementations of the conjugate element circuits possible consisting of offset mixers, filters, modulation means, etc., and other circuit details that can be implemented without changing the intent and concept of the invention.

It will be readily apparent that the invention presented herein is applicable to line of sight communications links. The required gain around the loop for meteor trail communications will be greater than the inverse range squared relationship common with systems working within line of sight of each other because of the loss in the scattering by the trail. It can be 50 dB and more greater.

The advantages of the system disclosed herein over current technology are: The greater number of meteors that can be intercepted per unit time by the broad angle of the element pattern, faster initiation of the link by means of the oscillation loop which does not require probing transmissions, zooming of the high gain narrow beams on a meteor trail from both stations, automatic tracking of any motion of the meteor trail, optimum gain of the peak of the beams is used at all times, wider bandwidth of the modulation channel by pointing to the highest electron density portion of the meteor trail and rejecting multiple paths by other active meteors outside of the narrow beam, increasing the working time on each meteor by using the higher gain to work longer on the decreasing electron density of each trail, the capability to acquire lower density meteor trails, the ability to assign discreet address filters to many stations in a coverage area, the ability to work more than one meteor trail simultaneously by multiple beams at different frequencies from one array thereby increasing the throughput or the number of stations or use as relay station.

The retrodirective adaptive loop as previously described depends upon the build up of coherent noise to form a pilot signal which will then point a narrow beam in the direction of a cooperating meteor trail. This coherent build up would, in effect, focus receiver and transmitter antennas to provide a full duplex link.

An alternate approach to loop build up can be accomplished based on phase lock loops and phase correlation. The circuit for implementing this alternate approach, a spatial servo-loop, which can be used to implement a conjugate element circuit, is shown in FIG. 7.

Figure 7:
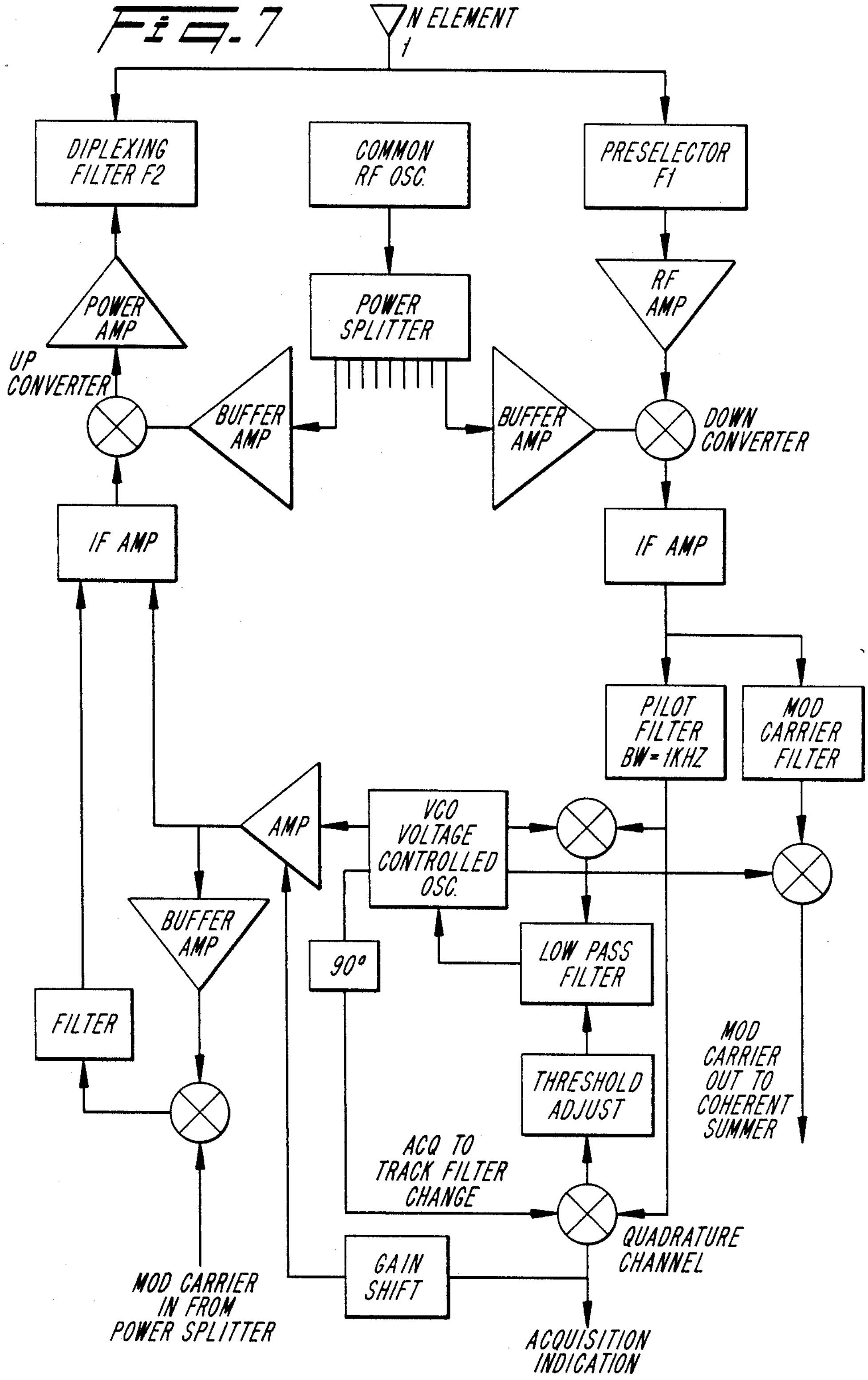
FIG. 7 is a block diagram of a spatial servo loop implementation of a conjugate element.

The difference between the circuit shown in FIG. 7 and that in FIG. 6 is that the pilot signal initially transmitted will be the voltage controlled oscillator signal of the phase locked loop rather than the amplified noise signal of the receiver front end. Since each conjugate element of the phased array antenna has an independent oscillator, the phased array antenna will not be correlated and the transmission pattern will be individual patterns of each conjugate element. This is because the signals transmitted from the phased array antenna are not in synchronization, and therefore not correlated in frequency or phase and thus appear noise like. The build up in the effective radiated power (ERP) would operate as a closed loop servo function. Upon receiving the noise like signal at the receiver, the receiver would retransmit a correlated averaged phase and frequency signal. The correlated signal would iteratively focus the phased array antennas through retrodirective transmissions from the transmitters to the receivers, thereby focusing each phased array and receiver phased array which would increase the gain of the retrodirective feedback loop. A few retrodirective transmissions are required in order to have the transmitter and receiver phased array antennas completely focused at each other. The increased level of feedback would be proportional to the two-way array gain. For meteor burst communications, the increase in gain for a 16 element antenna arrays at the receiver and transmitter would be 24 dB.

It will be apparent to those skilled in the art that various modifications can be made to the communication system of the instant invention without departing from the scope or spirit of the invention, and it is intended that the present invention cover modifications and variations of the retrodirective adaptive loop of the present invention provided they come within the scope of the appended claims and their equivalents.

We claim:

1. A communications system comprising:

a scattering medium having a stream of reflectors;

a first plurality of conjugate elements, each having a spatial servo loop for phase locking on to a pilot signal;

a second plurality of conjugate elements, each having a spatial servo loop for phase locking on to the pilot signal;

a first station having a first phased-array antenna including said first plurality of conjugate elements, capable of forming a first broad beamwidth and a first narrow beamwidth, with said first plurality of conjugate elements in view of said scattering medium;

means located at said first station and coupled to said first phased array antenna, for transmitting the pilot signal from said first phased array antenna using the first broad beamwidth;

at least a second station remotely located from said first station, having a second phased-array antenna having said second plurality of conjugate elements, capable of forming a second broad beamwidth and a second narrow beamwidth, with said second plurality of conjugate elements in common view of said scattering medium with said first phased-array antenna, wherein said second plurality of conjugate elements, responsive to receiving with the second broad beamwidth the pilot signal transmitted from said first phased-array antenna and reflected from said scattering medium, retransmit the pilot signal to said first station from said second phased-array antenna using the second narrow beamwidth, thereby transmitting a second retrodirective wavefront; and wherein said first plurality of conjugate elements of said first phased-array antenna, located at said first station and responsive to receiving with the first broad beamwidth and, with said spatial servo loop, phase locking onto the pilot signal retransmitted from said second phased-array antenna and reflected from said scattering medium, retransmits the pilot signal to said second station, thereby transmitting a first retrodirective wavefront, and wherein said first phased-array antenna responsive to receiving the retransmitted pilot signal from said second phased-array antenna, forms the first narrow beamwidth focused at said scattering medium, and said second phased-array antenna responsive to receiving the retransmitted pilot signal from said first phased-array antenna forms the second narrow beamwidth focused at said scattering medium, wherein a free space oscillating loop using a zoom lens effect is established with said first phased-array antenna using the first narrow beamwidth and said second phased-array antenna using the second narrow beamwidth, focused in common view of said scattering medium, and data are transmitted between said first plurality of conjugate elements and said second plurality of conjugate elements.

2. A communications system comprising:

a scattering medium having a stream of reflectors;

a first plurality of conjugate elements, each having a spatial servo loop for phase locking on to a pilot signal, said first plurality of conjugate elements capable of forming a first broad beamwidth and a first narrow beamwidth, with said first plurality of conjugate elements in view of said scattering medium;

a second plurality of conjugate elements, each having a spatial servo loop for phase locking on to the pilot signal, said second plurality of conjugate elements capable of forming a second broad beamwidth and a second narrow beamwidth, with said second plurality of conjugate elements in view of said scattering medium with said first phased-array antenna;

means located at said first plurality of conjugate elements and coupled to said first plurality of conjugate elements, for transmitting the pilot signal from said first plurality of conjugate elements using the first broad beamwidth;

wherein said second plurality of conjugate elements, responsive with the second broad beamwidth to receiving the pilot signal transmitted from said first plurality of conjugate elements and reflected from said scattering medium, retransmits the pilot signal to said first plurality of conjugate elements from said second plurality of conjugate elements using the second narrow beamwidth, thereby transmitting a second retrodirective wavefront; and wherein said first plurality of conjugate elements of said first phased-array antenna, responsive to receiving with the first broad beamwidth, the pilot signal retransmitted from said second plurality of conjugate elements and reflected from said scattering medium, retransmits the pilot signal to said second plurality of conjugate elements, thereby transmitting a first retrodirective wavefront, and wherein said first plurality of conjugate elements responsive to receiving the retransmitted pilot signal from said second plurality of conjugate elements, forms the first narrow beamwidth focused at said scattering medium, and said second plurality of conjugate elements responsive to receiving the retransmitted pilot signal from said first phased-array antenna forms the second narrow beamwidth focused at said scattering medium, wherein a free space oscillating loop using a zoom lens effect is established with said first plurality of conjugate elements using the first narrow beamwidth and said second plurality of conjugate elements using the second narrow beamwidth, focused in common view of said scattering medium, and data are transmitted between said first plurality of conjugate elements and said second plurality of conjugate elements.

3. A communications system comprising:

a scattering medium having a stream of reflectors;

first station having a first phased-array antenna capable of forming a first broad beamwidth and a first narrow beamwidth, with first conjugate elements in view of said scattering medium;

means located at said first station and coupled to said first phased array antenna, for transmitting a pilot signal from said first phased array antenna using the first broad beamwidth;

at least a second station remotely located from said first station, having a second phased-array antenna capable of forming a second broad beamwidth and a second narrow beamwidth, with second conjugate elements in common view of said scattering medium with said first phased-array antenna, wherein said second conjugate elements, responsive to receiving with the second broad beamwidth, the noise like pilot signal transmitted from said first phased-array antenna and reflected from said scattering medium, retransmit the pilot signal to said first station from said second phased-array antenna using the second narrow beamwidth, thereby transmitting a second retrodirective wavefront; and wherein said first conjugate elements of said first phased-array antenna, located at said first station and responsive to receiving with the first broad beamwidth, the pilot signal retransmitted from said second phased-array antenna and reflected from said scattering medium, retransmit the pilot signal to said second station, thereby transmitting a first retrodirective wavefront, and wherein said first phased-array antenna responsive to receiving the retransmitted pilot signal from said second phased-array antenna, forms the first narrow beamwidth focused at said scattering medium, and said second phased-array antenna responsive to receiving the retransmitted pilot signal from said first phased-array antenna forms the second narrow beamwidth focused at said scattering medium, wherein a free space oscillating loop using a zoom lens effect is established with said first phased-array antenna using the first narrow beamwidth and said second phased-array antenna using the second narrow beamwidth, focused in common view of said scattering medium, and data are transmitted between said first plurality of conjugate elements and said second plurality of conjugate elements.

4. A communications system comprising:

a scattering medium having a stream of reflectors;

first antenna means with first conjugate elements in view of said scattering medium, for forming a first broad beamwidth and a first narrow beamwidth;

means coupled to said first antenna means, for transmitting a pilot signal from said first antenna means with the first broad beamwidth;

at least second antenna means remotely located from said first antenna means, with second conjugate elements in common view of said scattering medium with said first antenna means, for forming a second broad beamwidth and a second narrow beamwidth, wherein said second conjugate elements, responsive to receiving with the second broad beamwidth, the pilot signal transmitted from said first antenna means and reflected from said scattering medium, retransmit the pilot signal to said first antenna means from said second antenna means with the second narrow beamwidth; and wherein said first conjugate elements of said first antenna means, responsive to receiving with the first broad beamwidth, the pilot signal retransmitted from said second antenna means and reflected from said scattering medium, retransmit the pilot signal to said second antenna means, and wherein said first antenna means responsive to receiving the retransmitted pilot signal from said second antenna means, forms the first narrow beamwidth focused at said scattering medium, and said second antenna means responsive to receiving the transmitted pilot signal from said first antenna means forms the second narrow beamwidth focused at said scattering medium, wherein a free space oscillating loop using a zoom lens effect is established with said first antenna means with the first narrow beamwidth and said second antenna means with the second narrow beamwidth focused in common view of said scattering medium, and data are transmitted between said first plurality of conjugate elements and said second plurality of conjugate elements.

5. A communication system comprising:

a scattering medium having a stream of reflectors;

first antenna means with first conjugate elements in view of said scattering medium, for forming a first broad beamwidth and a first narrow beamwidth;

means coupled to said first antenna means, for transmitting a pilot signal from said first antenna means with the first broad beamwidth;

at least second antenna means remotely located from said first antenna means, with second conjugate elements in common view of said scattering medium with said first antenna means, wherein said second conjugate elements, responsive to receiving with a second broad beamwidth, the pilot signal transmitted from said first antenna means and reflected from said scattering medium, retransmit the pilot signal to said first antenna means from said second antenna means; and wherein said first conjugate elements of said first antenna means, responsive to receiving with the first broad beamwidth, the pilot signal retransmitted from said second antenna means and reflected from said scattering medium, retransmit the pilot signal to said second antenna means, and wherein said first antenna means responsive to receiving the retransmitted pilot signal from said second antenna means, forms the first narrow beamwidth focused at said scattering medium, wherein a free space oscillating loop using a zoom lens effect is established with said first antenna means with the first narrow beamwidth and said second antenna means focused in common view of said scattering medium, and data are transmitted between said first plurality of conjugate elements and said second plurality of conjugate elements.

6. A communications system comprising:

a scattering medium having a stream of reflectors;

first antenna means with first conjugate elements in view of said scattering medium;

means coupled to said first antenna means, for transmitting a pilot signal from said first antenna means;

at least second antenna means remotely located from said first antenna means, with second conjugate elements in common view of said scattering medium with said first antenna means, wherein said second conjugate elements, responsive to receiving with a second broad beamwidth, the pilot signal transmitted from said first antenna means and reflected from said scattering medium, retransmit the pilot signal to said first antenna means; and wherein said first conjugate elements of said first antenna means, responsive to receiving with the first broad beamwidth, the pilot signal retransmitted from said second antenna means and reflected from said scattering medium, retransmit the pilot signal to said second antenna means, wherein a free space oscillating loop using a zoom lens effect is established with said first antenna means and said second antenna means focused in common view of said scattering medium, and data are transmitted between said first plurality of conjugate elements and said second plurality of conjugate elements.

7. A communications system comprising:

a first plurality of conjugate elements, each having a spatial servo loop for phase locking on to a pilot signal;

a second plurality of conjugate elements, each having a spatial servo loop for phase locking on to the pilot signal;

a first station having a first phased-array antenna including said first plurality of conjugate elements, capable of forming a first broad beamwidth and a first narrow beamwidth;

means located at said first station and coupled to said first phased array antenna, for transmitting the pilot signal from said first phased array antenna using the first broad beamwidth;

at least a second station remotely located from said first station, having a second phased-array antenna having said second plurality of conjugate elements, capable of forming a second broad beamwidth and a second narrow beamwidth, with said second plurality of conjugate elements in common view of said first phased-array antenna, wherein said second plurality of conjugate elements, responsive to receiving with the second broad beamwidth, the pilot signal transmitted from said first phased-array antenna, retransmits the pilot signal to said first station from said second phased-array antenna using the second narrow beamwidth, thereby transmitting a second retrodirective wavefront; and wherein said first plurality of conjugate elements of said first phased-array antenna, located at said first station and responsive to receiving with the first broad beamwidth, the pilot signal retransmitted from said second phased-array antenna, retransmits the pilot signal to said second station, thereby transmitting a first retrodirective wavefront, and wherein said first phased-array antenna responsive to receiving the retransmitted pilot signal from said second phased-array antenna, forms the first narrow beamwidth focused at said second phased-array antenna, and wherein said second phased-array antenna responsive to receiving the retransmitted pilot signal from said first phased-array antenna forms the second narrow beamwidth focused at said first phased-array antenna, wherein a free space oscillating loop using a zoom lens effect is established with said first phased-array antenna using the first narrow beamwidth and said second phased-array antenna using the second narrow beamwidth, and data are transmitted between said first plurality of conjugate elements and said second plurality of conjugate elements.

8. The communications system as set forth in claim 1, wherein once the free space oscillating loop is established, the pilot signal is used as a carrier for a modulation signal.

9. The communications system as set forth in claim 8, wherein once the free space oscillating loop is established, the pilot signal is used as a carrier for a modulation signal by coherent offset.

10. The communications system as set forth in claim 2, wherein once the free space oscillating loop is established, the pilot signal is used as a carrier for a modulation signal.

11. The communications system as set forth in claim 10, wherein once the free space oscillating loop is established, the pilot signal is used as a carrier for a modulation signal by coherent offset.

12. The communications system as set forth in claim 3, wherein once the free space oscillating loop is established, the pilot signal is used as a carrier for a modulation signal.

13. The communications system as set forth in claim 12, wherein once the free space oscillating loop is established, the pilot signal is used as a carrier for a modulation signal by coherent offset.

14. The communications system as set forth in claim 4, wherein once the free space oscillating loop is established, the pilot signal is used as a carrier for a modulation signal.

15. The communications system as set forth in claim 14, wherein once the free space oscillating loop is established, the pilot signal is used as a carrier for a modulation signal by coherent offset.

16. The communications system as set forth in claim 5, wherein once the free space oscillating loop is established, the pilot signal is used as a carrier for a modulation signal.

17. The communications system as set forth in claim 16, wherein once the free space oscillating loop is established, the pilot signal is used as a carrier for a modulation signal by coherent offset.

18. The communications system as set forth in claim 6, wherein once the free space oscillating loop is established, the pilot signal is used as a carrier for a modulation signal.

19. The communications system as set forth in claim 18, wherein once the free space oscillating loop is established, the pilot signal is used as a carrier for a modulation signal by coherent offset.

20. The communications system as set forth in claim 7, wherein once the free space oscillating loop is established, the pilot signal is used as a carrier for a modulation signal.

21. The communications system as set forth in claim 14, wherein once the free space oscillating loop is established, the pilot signal is used as a carrier for a modulation signal by coherent offset.

22. The communications system as set forth in claim 1, 2, 3, 4, 5, or 6, wherein the pilot signal of the free space oscillating loop is used as a carrier for a modulated signal.

* * * * *

UNITED STATES PATENT AND TRADEMARK OFFICE
CERTIFICATE OF CORRECTION

PATENT NO. : 4,985,707

DATED : January 15, 1991

INVENTOR(S) : CHARLES J. SCHMIDT, JOSEPH KADIN, S. EUGENE POTEAT

It is certified that error appears in the above-identified patent and that said Letters Patent is hereby corrected as shown below:

Title page item (75):

Add --ELLIOT GRUENBERG, West New York, N.J.--

Signed and Sealed this

Twenty-seventh Day of October, 1992

*Attest:*

DOUGLAS B. COMER

*Attesting Officer* *Acting Commissioner of Patents and Trademarks*